(12) United States Patent
Primeau

(10) Patent No.: US 7,333,156 B2
(45) Date of Patent: Feb. 19, 2008

(54) SEQUENTIAL COLOUR VISUAL TELEPRESENCE SYSTEM

(75) Inventor: Gilles Primeau, Pierrefonds (CA)

(73) Assignee: Canadian Space Agency, Saint-Hubert, Quebec (CA)

( * ) Notice: Subject to any disclaimer, the term of this patent is extended or adjusted under 35 U.S.C. 154(b) by 94 days.

(21) Appl. No.: 10/384,622

(22) Filed: Mar. 11, 2003

(65) Prior Publication Data

US 2003/0164900 A1 Sep. 4, 2003

Related U.S. Application Data

(63) Continuation of application No. 09/383,070, filed on Aug. 26, 1999, now abandoned.

(51) Int. Cl.
*H04N 9/12* (2006.01)
(52) U.S. Cl. ............... 348/742; 348/268; 348/269; 348/739
(58) Field of Classification Search ............... 348/742, 348/743, 456, 268, 271, 455, 71, 73
See application file for complete search history.

(56) References Cited

U.S. PATENT DOCUMENTS

| | | | |
|---|---|---|---|
| 3,783,184 A | | 1/1974 | Ernstoff et al. |
| 4,090,219 A | | 5/1978 | Ernstoff et al. |
| 4,851,899 A | | 7/1989 | Yoshida et al. |
| 4,967,264 A | * | 10/1990 | Parulski et al. ............. 348/271 |
| 5,103,300 A | * | 4/1992 | Nitta et al. .................. 348/270 |
| 5,256,415 A | * | 10/1993 | Corstvet et al. ......... 424/255.1 |
| 5,258,834 A | * | 11/1993 | Tsuji et al. ................... 348/71 |
| 5,264,925 A | * | 11/1993 | Shipp et al. ................. 348/269 |
| 5,369,450 A | * | 11/1994 | Haseltine et al. ........... 348/745 |
| 5,642,129 A | | 6/1997 | Zavracky et al. |
| 5,684,498 A | * | 11/1997 | Welch et al. ................... 345/8 |
| 5,748,236 A | * | 5/1998 | Shibazaki .................... 348/270 |
| 6,256,415 B1 | * | 7/2001 | Ratnakar ..................... 382/232 |
| 2002/0101546 A1 | * | 8/2002 | Sharp et al. ................. 348/760 |

FOREIGN PATENT DOCUMENTS

GB 2 277 654 11/1994

* cited by examiner

*Primary Examiner*—Trang U Tran
(74) *Attorney, Agent, or Firm*—Richard J. Mitchell; Marks & Clerk

(57) ABSTRACT

For implementing an anthropomorphic visual telepresence system with high resolution and low loop latency a sequential color video loop is provided. A sequential color camera sequentially captures color images, each captured image consisting of a portion of a single color component, and provides information as separate color information relating to portions of the sequentially sensed color images. The information is transmitted as separate color information. A sequential color display receives the transmitted information and displays sequentially each color image within the received information. Synchronization means synchronize the sequence and color of corresponding portions of images comprising a single color in said display with the portions of the images sensed by said camera.

15 Claims, 8 Drawing Sheets

| | $t_{frame\_sc}$ (msec) | $f_{frame\_sc}$ (Hz) | $t_{primary\_color}$ (msec) | $f_{primary\_color}$ (Hz) | $t_{latency\_min}$ (msec) |
|---|---|---|---|---|---|
| NTSC-derived | 33.3 | 30 | 11.1 | 90 | 0 |
| PAL/SECAM-derived | 40 | 25 | 13.3 | 75 | 0 |
| Custom | 40 to 16.7 | 25 to 60 | 13.3 to 5.56 | 75 to 180 | 0 |

SEQUENTIAL COLOUR VISUAL TELEPRESENCE SYSTEM

This application is a continuation of U.S. patent application Ser. No. 09/383,070 filed Aug. 26, 1999 now abandoned.

FIELD OF THE INVENTION

The present invention relates to visual telepresence systems. More particularly, the present invention relates to an anthropomorphic visual telepresence system having a high resolution and a low loop latency.

BACKGROUND OF THE INVENTION

The concept of telepresence has been in the public domain since the early 1960s, when Ivan Sutherland demonstrated its basic principles. Two major components of a visual telepresence system are a head mounted display (HMD) and its associated high speed servomechanism on which video cameras are mounted. Two other important components of a visual telepresence system are a head tracker and a communications system linking the HMD with the high-speed servomechanism. When an operator, wearing the HMD, moves her head in any direction, the head tracker senses that movement, sends the appropriate position data to the high-speed servomechanism, which thereby tracks in real-time or in near real-time the operator's head movements. Images from the video cameras mounted on the high-speed servomechanism are transmitted through the communications system to a display positioned in front of the eyes of the operator; for example, such a display forms part of the HMD. As a result, the operator is given a visual impression similar to that from a same location as the remote cameras.

In order to describe this concept more accurately, the term anthropomorphic is often used, whereby a human-shaped configuration is implied. Many systems have been referred to as telepresence systems, for example a camera mounted on a pan and tilt servomechanism controlled by a joystick and in communication with a conventional monitor. This necessitates the use of the term anthropomorphic to provide a more accurate description of human-shaped telepresence wherein the camera is tracking in real-time or near real-time the head and/or eye movement of an operator, and the images thereby gathered by the camera are displayed directly in front of the eyes of the operator.

The use of anthropomorphic visual telepresence is highly advantageous for the operation of remote controlled vehicles. With current advancements in robotic technology the use of remote systems is steadily increasing, especially for performing tasks in hazardous environments where the lives of people are at risk. Hazardous environments are found, for example, in nuclear installations where radiation is a significant concern; in the production and handling of chemicals and explosives; in mining; and in underwater operations such as offshore oil exploration. Further applications include emergency, search and rescue operations, as well as space applications, such as controlling robots and/or vehicles located in the environment of space, while remaining in the safer location of a spacecraft or other human-tended spaceborne habitat. The operator of the remote controlled vehicle is located in a safe place, from which he or she controls the vehicle using other human-machine interface components such as a joystick, while the HMD gives him or her the visual impression of being physically located at a same location as the cameras, which are controlled by the movement of his or her head.

Generally, a telepresence system attempts to recreate an environment for an operator of a remote system. The better the environmental factors are recreated, the more natural the resulting control process is. Of course, because the environmental factors are recreated, the "simulation" is often implemented with safety in mind. For example, radiation levels are not usually simulated other than by showing gauges of sensors within the remote system. In some instances, some environmental factors are altered for providing useful feedback. For example, temperature is raised and lowered to indicate temperature changes, but the simulated temperatures are scaled for operator comfort and safety.

The human visual system is marvelous. From birth, our brain learns to process visual data. The visual data is real-time visual data (for the most part). To clarify, what is seen in a person's hand is felt in their hand at the same time and in the same place. The latency between seeing, feeling and manipulating is truly negligible. This is particularly true of the often occurring situation where a person rotates their head and/or eyes to center an object of interest into the so-called foveal area of the human visual system, from the peripheral area where it was previously located. In such a situation, the brain almost instantly processes new retinal information, and the object of interest is perceived without noticeable delay. Unfortunately, with anthropomorphic visual telepresence systems, this is not so. A small latency of more than a few tens of milliseconds is very noticeable. The brain of an operator of an anthropomorphic visual telepresence system having such a latency is not used to dealing with such a delay. Hence, psycho-physiological discomfort results. Of course, when the latency is negligible these reactions do not occur or are greatly lessened since the brain is operating in its normal mode of operation. It is also clear to those skilled in the art of visual telepresence that latency or time delay between a movement of the HMD worn by the operator, and return of corresponding video images reflecting appropriate movement of the high-speed servomechanism, is a very critical parameter, and that the degree of susceptibility to such latency varies among subjects.

Of course, a similar problem exists with image resolution. The human eye captures images at a high resolution. This resolution is actually variable across the retina, from its maximum in the so-called foveal region to its minimum in the peripheral region. For stationary images, the human brain assembles these images and enhances resolution or accepts the limited resolution presented; however, for moving images, the quantisation—dividing the image into individual points—at a low resolution results in choppy or discretised movement, as opposed to being relatively smooth and continuous as provided by the human visual system. For example, if each square inch of an image is displayed as a single dot, from a location close to the display, a baseball would appear less round and its motion would appear to jump an inch at a time. This also results in psycho-physiological discomfort, such as headaches and nausea, when experienced continuously for extended periods of time. Therefore, it is clear to those skilled in the art of visual telepresence that the resolution of displayed images is of primary importance. It is also well known to those skilled in the art of visual telepresence that video image transmission using analog radio frequency techniques is significantly less robust than video image transmission using digital radio frequency techniques. When using analog video image transmission, frequent interference-induced loss of horizontal and/or vertical synchronization signals may occur. This is significantly reduced when using digitised video image transmission. Loss of synchronization also contributes to psycho-physiological discomfort of an operator wearing the HMD. Therefore, it is often desirable to use digitised video transmission. Unfortunately, this results in a significant increase of the required radio frequency bandwidth for transmission of the video signal. Digital signal compression and decompression, also referred to as CODEC, reduces the required bandwidth but results in added loop latency due to the image processing performed. In situations requiring the use of digitised video image transmission, an anthropomorphic visual telepresence architecture either uses a high transmission bandwidth or suffers the added latency resulting from using the CODEC.

With regards to resolution for applications where colour is required, the implementation of field sequential colour imaging is very successful. In field sequential colour imaging, a colour image is composed of a succession of primary colour components—typically red, green and blue—of the desired image. Several patents have been issued for sequential colour cameras. Similarly, many patents have been issued for sequential colour displays. The field of sequential colour displays is generally a more recent field than that of sequential colour cameras.

It is well known to those skilled in the art of colour image displays that sequential colour displays, when using a sufficiently fast sequential rate so that the human brain will imperceptibly fuse the primary colour images into full colour images, achieve a much higher effective resolution than the more conventionally used composite displays, for which it is implied that the information of all colours is displayed simultaneously instead of sequentially. This is due to the fact that in composite colour displays, a technique must be used in which the available display surface must be subdivided into several primary color groups often referred to as red green blue triads, thus leading to a resolution loss. With sequential colour displays, all of the display's resolution is available for each primary color, as the display's surface does not have to be allocated among the three primary colors.

U.S. Pat. No. 5,684,498 issued Nov. 4, 1997 to Welch et al. describes the use of standard composite colour cameras in conjunction with a sequential colour display forming part of a HMD. This approach leads to colour fringing whenever the HMD is in motion at an appreciable rate. The method described by Welch suppresses colour fringing based on data from rate sensors measuring the motion of the HMD. This method suffers from the inherent inaccuracies of the rate sensors in detection of an acceleration of a head on which the HMD is mounted. Therefore, the image shifting implemented to suppress colour fringing imperfectly corrects for the colour fringing. The method taught by Welch does not achieve a maximum resolution because it uses a composite colour source at its input. Furthermore, the conversion of the composite colour signal into a field sequential colour signal results in additional loop latency.

It is, therefore, an object of this invention to provide an anthropomorphic visual telepresence system having a high resolution and a low loop latency.

It is further an object of this invention to provide an anthropomorphic visual telepresence system enabling, when desired, the use of digital video compression and decompression techniques, while maintaining loop latency within acceptable limits.

SUMMARY OF THE INVENTION

In accordance with the invention there is provided a sequential colour anthropomorphic visual telepresence system comprising:
a sequential colour camera for sequentially capturing colour images, each captured image consisting of a portion of a single colour component, and for providing information as separate colour information relating to portions of the sequentially sensed colour images;
transmission means for transmitting an electrical signal including the information as separate colour information;
a sequential colour display for receiving the transmitted signal and for displaying sequentially each colour image within the received information; and,
synchronization means for synchronizing the sequence and colour of corresponding portions of images comprising a single colour in said display with the portions of the images sensed by said camera.

BRIEF DESCRIPTION OF THE DRAWINGS

The preferred embodiments of this invention will now be described in conjunction with the attached drawings, in which.

In the figures "sc" refers to sequential colour, "t" refers to time duration, "msec" refers to milliseconds, "f" refers to frequency, "Hz" refers to Hertz (cycles per second), and NTSC, PAL, and SECAM refer to commonly known television signal standards. Using interlacing a full image, referred to as a "frame", is composed of a successive presentation of two half images, referred to as a "field". Each "field" commonly consists of odd or even numbered image lines of a "frame", respectively.

DETAILED DESCRIPTION OF THE INVENTION

Figure 1:
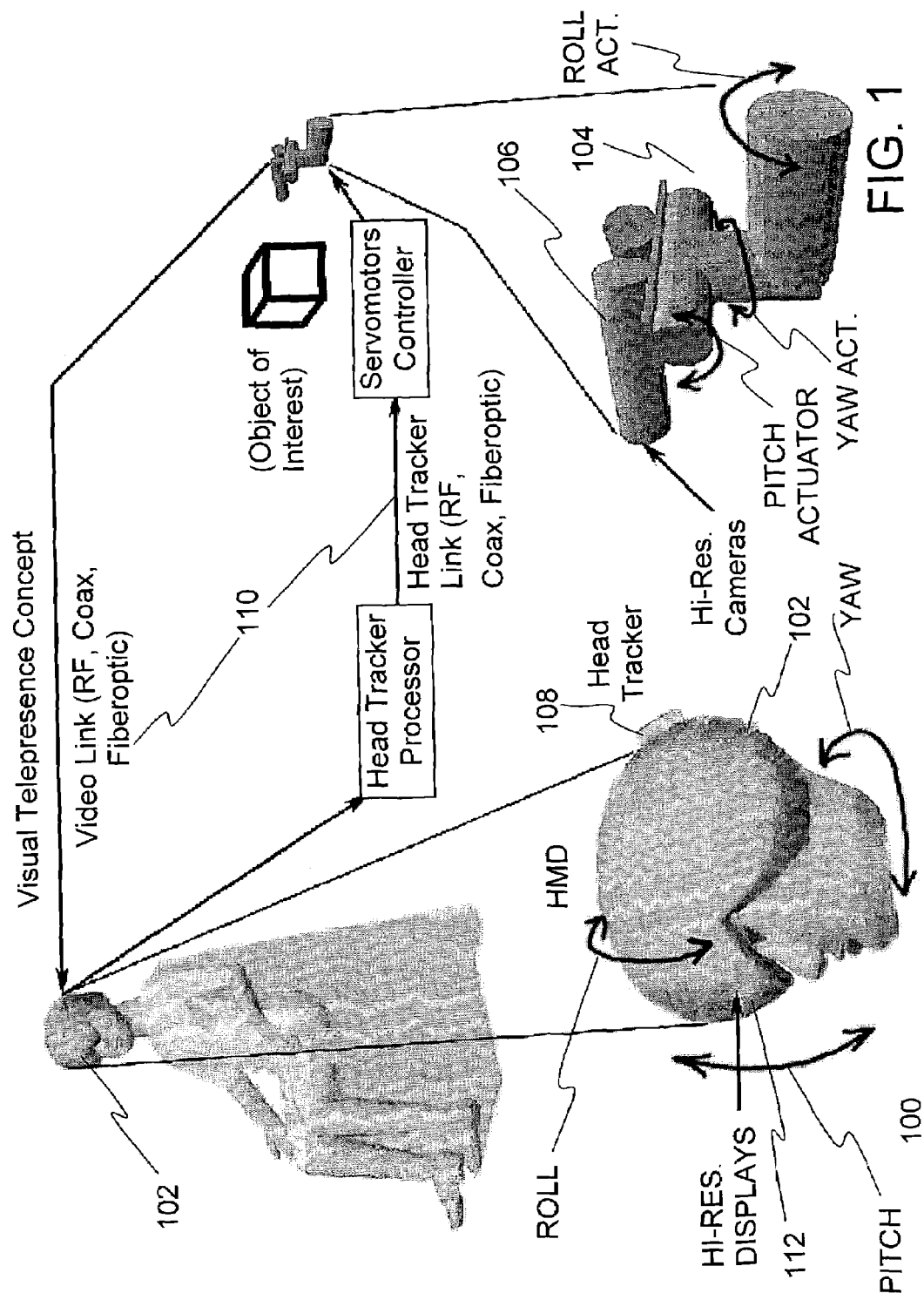
FIG. 1 illustrates a visual telepresence system.

FIG. 1 illustrates a basic visual telepresence system 100, with three axes of rotation used to emulate human neck movement. Two major components of the visual telepresence system 100 are a head mounted display (HMD) 102, and its associated high speed servomechanism 104 on which video cameras 106 are mounted. Other important components of the visual telepresence system 100 are a head tracker 108 and a communication system 110 that links the HMD 108 with the high speed servomechanism 104. When an operator, wearing the HMD 102 moves her head in any direction, the head tracker 108 senses that movement and sends appropriate position data to the high speed servo-mechanism 104, which thereby tracks in real-time or in near real-time the operator's head movements. Images from the video cameras 106 mounted on the high-speed servomechanism 104 are transmitted through the communications system 110 to a display 112 positioned in front of the eyes of the operator; for example, such a display forms part of the HMD 102. In some applications two video cameras 106 are provided at a same distance as the human eyes. Images gathered by the two video cameras are simultaneously displayed in front of each of the operator's eyes, respectively, creating a stereo-visional impression of three dimensional space imaged by the cameras.

Figure 2:
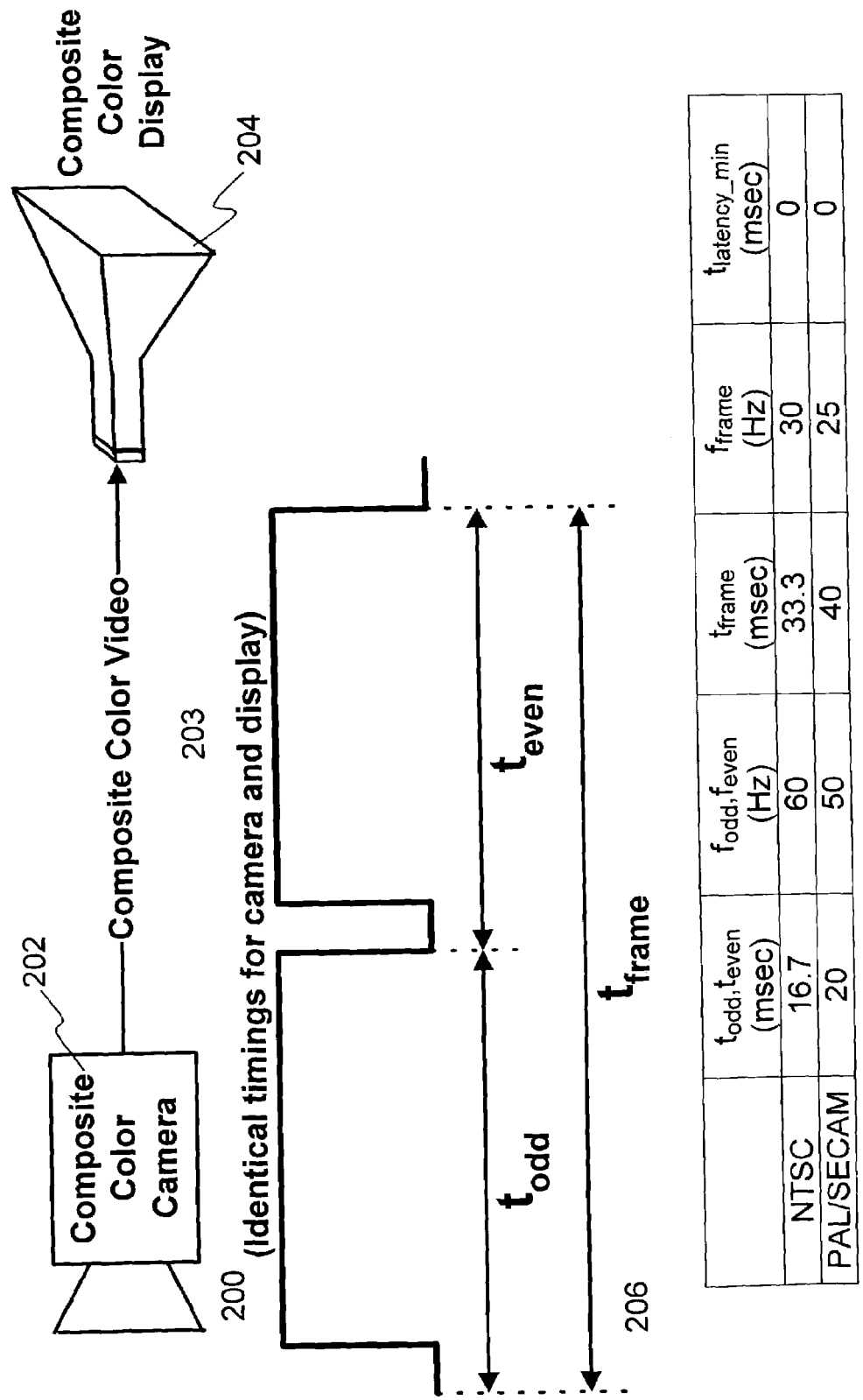
FIG. 2 illustrates a composite colour video loop according to the prior art.

Prior art visual telepresence systems, as shown in FIG. 2, use a composite colour video loop 200. A composite colour camera 202 is linked by a communication link 203 to a composite colour display 204. In composite colour video, all primary colours of a colour image are gathered simultaneously. Timing diagram 206 shows the timing of interlaced image fields comprising the odd and even numbered lines of an image separately sensed, transmitted and displayed. Table 208 shows the timing and frequencies for commonly available prior art video systems. In composite colour video a severe reduction in resolution occurs, due to the general arrangement of imaging sensors within, for example, a sensor array in red, green and blue triads. Using this method, the reduction in resolution for a coloured image can potentially attain a factor of three along one axis, in comparison to the resolution offered by a black and white or gray scale image for which the sensor's available pixels have not been shared among primary colour triads. This problem is further exacerbated with many of the display technologies often used in HMDs, due to the relatively low fill factor, or percentage of the surface serving in the display of an image, attainable with such technologies, along with the same triad arrangement situation previously described for composite colour cameras, which also adversely affects the resolution of such composite colour displays.

With regards to resolution for applications where colour is required, the implementation of sequential colour imaging is very successful. In field sequential colour imaging, a colour image is composed of a succession of primary colour components—red, green and blue—of the desired image. Using a display based on this same sequential colour technique the human retina and brain naturally integrate these colour components, if the rate at which the primary colour components are presented is sufficiently high, and a single colour image is perceived. The actual frequency of sequential colour imaging at which the retina and brain naturally integrate the colour components depends on the individual, brightness of the image and interlacing. When required, sensors sensitive to wavelengths outside the visible spectrum, for example infrared, are used. The sensed images are then converted into images comprising the primary colours of the visible spectrum for displaying.

Figure 3:
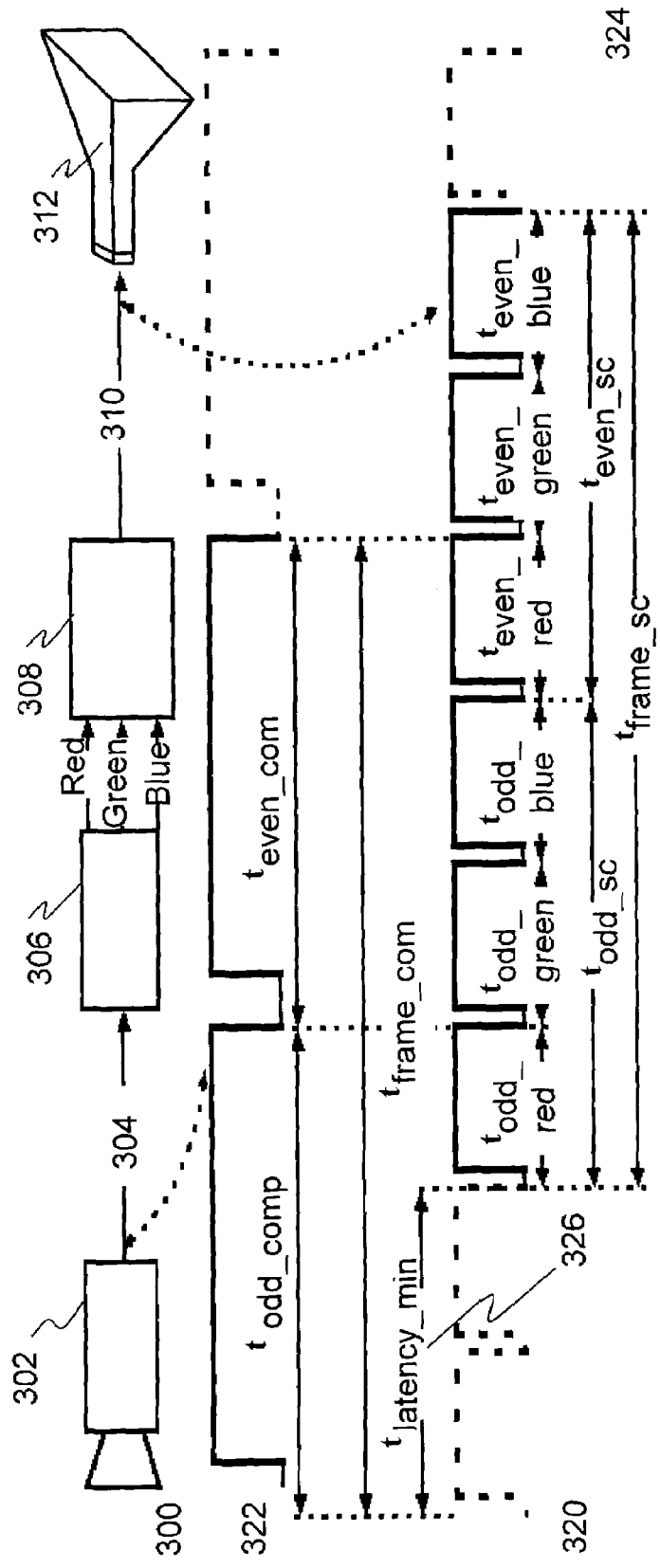
FIG. 3 illustrates a colour video loop according to the prior art comprising a composite colour camera and a sequential colour display.

FIG. 3 shows a visual telepresence system 300 according to Welch. A composite colour camera 302 is linked by a communication link 304 to colour separation means 306 in the form of a colour separator. The separated colour images consisting of three primary colour images are then converted into sequential colour images using parallel to serial conversion means 308 in the form of a parallel to serial converter which is linked by a communication link 310 to a sequential colour display 312. Timing diagram 320 shows the timing of interlaced image fields 322 produced by the composite colour camera 302 and the timing of the sequential colour image fields 324 after the conversion. The timing diagram 320 indicates the latency 326 resulting from colour separation and parallel to serial conversion. Table 330 shows the timing, frequencies and latency for commonly available prior art video systems. As is evident to those of skill in the art, the first primary colour image displayed has a minimum latency of 0 seconds. The second primary colour image has a minimum latency of ⅓ of the interval between composite images; for NTSC, this is $1/180^{th}$ of a second. The third primary colour image has a minimum latency of ⅔ of the interval between composite images; for NTSC, this is $2/180^{th}$ of a second.

It is an object of this invention to provide an anthropomorphic visual telepresence system having a high resolution and a low loop latency. To achieve a maximum resolution in a visual telepresence system, it is necessary to use a sequential colour camera as well as a sequential colour display. Specific means for synchronization (and sequence alignment) between camera and display is implemented in order to minimize loop latency. The anthropomorphic visual telepresence system according to this invention is highly advantageous in applications where significant concentration of an operator on a remote controlled vehicle is required. It eliminates or significantly reduces the main sources of an operator's psycho-physiological discomfort and allows the use of such a system for longer time periods or the use of such a system for critical operations.

Figure 4:
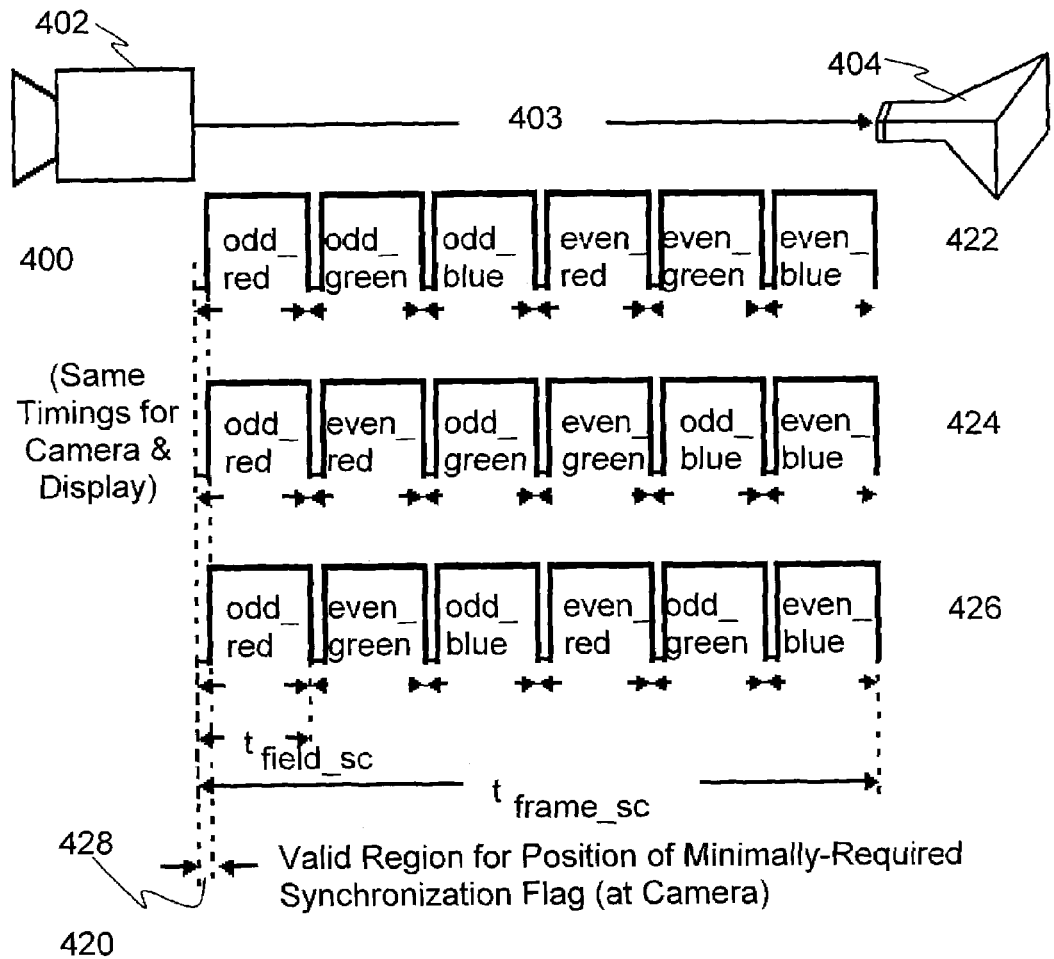
FIG. 4 illustrates a field sequential colour video loop according to the invention.

FIG. 4 shows an anthropomorphic visual telepresence system 400 according to the invention. A field sequential colour camera 402 is linked by a communication link 403 to a field sequential display 404. The field sequential colour camera 402 operates on the same basic principles as field sequential colour cameras described in prior art, excepting that an output therefrom is a field sequential colour signal. The communication link 403 is often a cable—for example, in environments such as nuclear facilities—but is sometimes a wireless communications link—for example, in space and underwater applications. The field sequential colour display 404 is for accepting a field sequential colour signal and for displaying said colour signal with little latency from receipt thereof. Timing diagram 420 shows the timing of sequential colour image fields produced by the field sequential colour camera 402, transmitted by the communication link 403 and displayed by the field sequential display 404. The sequential colour image fields are separately sensed, transmitted and displayed. The display of information relating to a single sequential colour image field occurs before receipt of information relating to the next sequential colour image field. In embodiment "A" 422 alternating fields cover the three primary colours in succession for the odd image line numbers field, and then repeated for the even image line numbers field. In embodiment "B" 424 the alternating fields cover in succession the odd and even image line number fields for one primary colour and then the process is repeated for the other two primary colours. In embodiment "C" 426 both, the field—odd/even image line numbers—and the primary colour at each new field, are alternated. The timing diagram 420 also shows a synchronization signal or flag 428 at the beginning of the image field sequence. The synchronization signal 428 ensures synchronization and sequence alignment of the alternating fields. The field sequential colour camera 420 adds the synchronization signal 428 at the beginning of the image field sequence, which is then transmitted to the field sequential colour display 404 for synchronization and colour sequence alignment. Without this synchronization signal 428, display technologies, even those using the inherent formatting of the incoming signal such as cathode ray tubes, have a possibility of sequence misalignment. For example a red camera image is displayed as a green display image. The synchronization signal 428 also helps to avoid data buffering, which results in additional loop latency. One synchronization signal 428 is sufficient, as long as the field sequential colour display 404 is for receiving a synchronization signal 428 at the relative position of this flag within the sequence. There are numerous other locations than the one shown in FIG. 4 for positioning the synchronization signal 428 within the image field sequence. Table 430 shows the timing, frequencies and latency for the present invention—a custom built system. Timing and frequencies of prior art video systems are shown for comparison.

Figure 5:
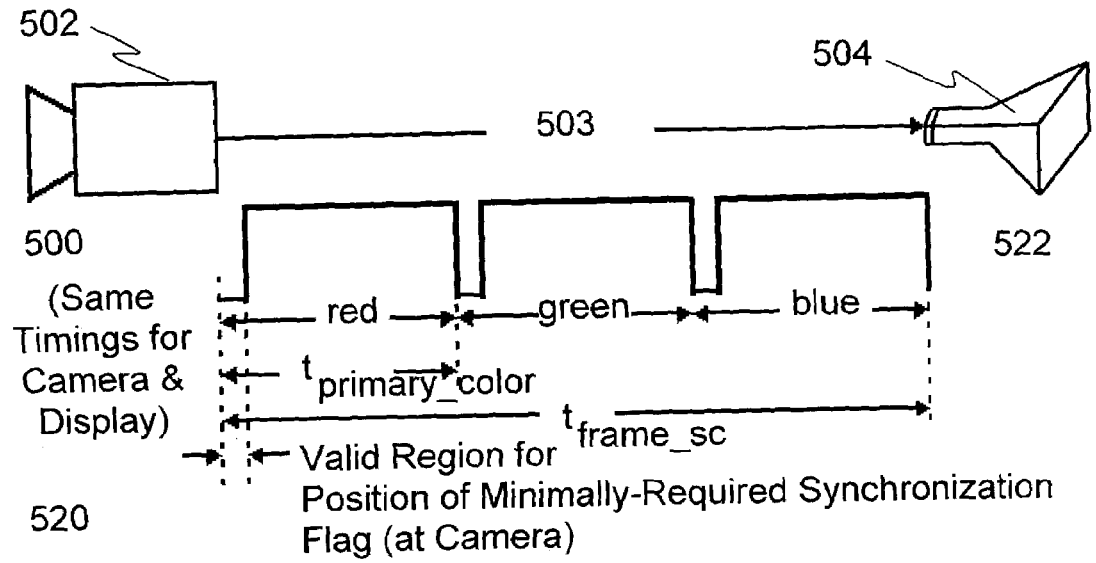
FIG. 5 illustrates a frame sequential colour video loop according to the invention.

FIG. 5 shows embodiment "D" 522 of an anthropomorphic visual telepresence system 500 according to the invention. A frame sequential colour camera 502 is linked by a communication link 503 to a frame sequential display 504. The frame sequential colour camera 502 operates on the same basic principles as frame sequential colour cameras described in prior art, excepting that an output therefrom is a frame sequential colour signal. The communication link 503 is often a cable but is sometimes a wireless communications. The field sequential colour display 504 is for accepting a frame sequential colour signal and for displaying said colour signal with minimal latency from receipt thereof. Timing diagram 520 shows the timing of sequential colour image frames produced by the frame sequential colour camera 502, transmitted by the communication link 503 and displayed by the frame sequential display 504. The sequential colour image frames are separately sensed, transmitted and displayed. The display of information relating to a single sequential colour image frame occurs before receipt of information relating to the next sequential colour image frame. Table 530 shows the timing, frequencies and latency for the present invention, Timing and frequencies of prior art video systems are shown for comparison.

When the transmission time is negligible, the minimum latency in the embodiments "A", "B", "C" and "D" approaches zero (see tables 430 and 530).

Figure 6:
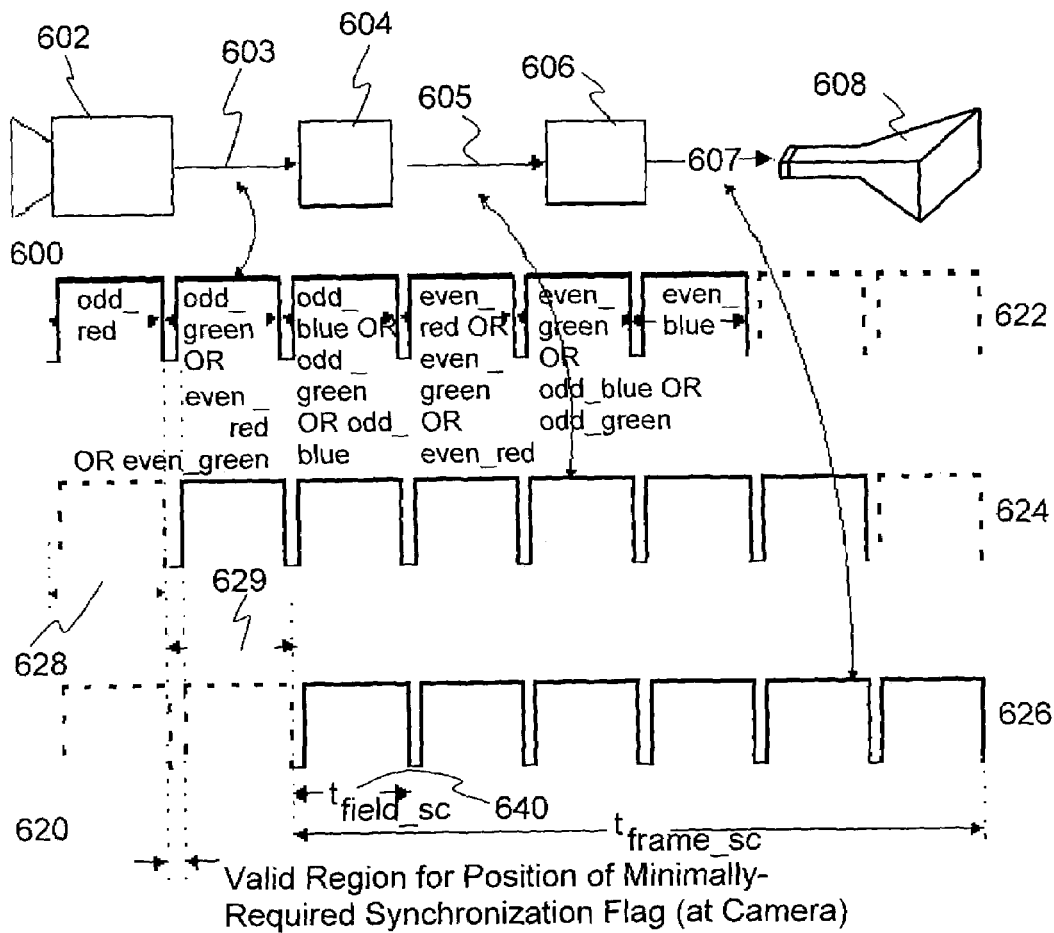
FIG. 6 illustrates a field sequential colour video loop with digital image compression and decompression according to the invention.

FIG. 6 shows embodiments "E", "F" and "G" 600 corresponding to embodiments "A", "B" and "C" of an anthropomorphic visual telepresence system according to the invention. The system comprises a field sequential colour camera 602, a communication link 603, digital image compression means 604 in the form of a digital image compressor, a digital data link 605, digital image decompression means 606 in the form of a digital image extractor for decompressing the compressed digital data, a communication link 607, and a field sequential colour display 608. The field sequential colour camera 602 operates on the same basic principles as field sequential colour cameras described in prior art, excepting that an output therefrom is a field sequential colour signal. The digital image compressor 604 is preferably in the form of dedicated hardware, firmware and software components implementing the compression portion of a CODEC so as to efficiently compress the data received from the field sequential colour camera 602 via the communication link 603 and thereby to maintain loop latency within reasonable limits. The digital data link 605 is often a cable but is sometimes a wireless communications. The digital image extractor is for extracting data compressed by the digital compressor, and is preferably in the form of dedicated hardware, firmware and software implementing the decompression portion of a CODEC so as to efficiently execute in reverse the algorithm used at the compression stage to restitute the original, uncompressed image, sometimes with some level of resulting image degradation in comparison to its original counterpart. Timing diagram 620 shows a timing graph 622 of sequential colour image fields from the field sequential colour camera 602, a timing graph 624 of compressed digital data provided by the digital image compression means 604, and a timing graph 626 of digital image data provided by the digital image decompression means 606 to the display 608. The timing diagram 620 also indicates a delay for compression 628 and decompression 629. The upper bound for the compression and decompression delay is preferably shorter than the duration of a field 640. Table 630 shows the timing, frequencies and latency for the present invention with timing and frequencies of prior art video systems for comparison.

Figure 7:
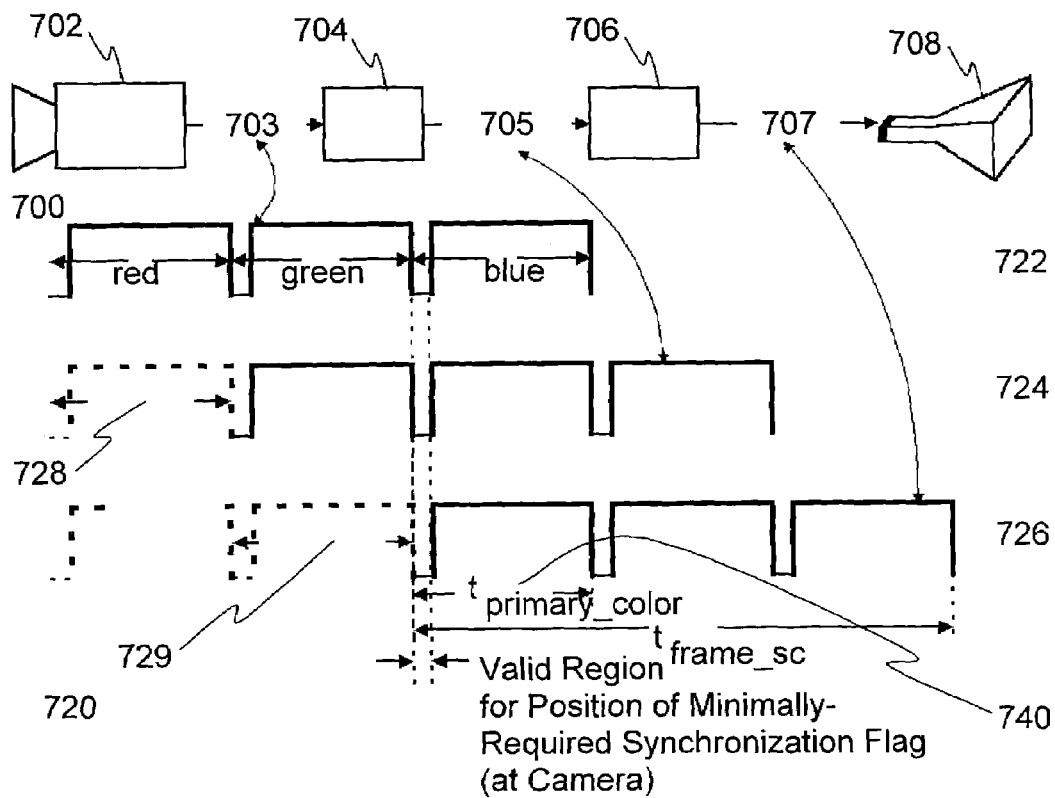
FIG. 7 illustrates a frame sequential colour video loop with digital image compression and decompression according to the invention.

FIG. 7 shows an embodiment "H" 700 corresponding to embodiment "D" of the anthropomorphic visual telepresence system according to the invention. The system comprises a frame sequential colour camera 702, a communication link 703, digital image compression means 704 in the form of a digital image compressor, a digital data link 705, digital image decompression means 706 in the form of a digital image extractor, a communication link 707 and a frame sequential colour display 708. The frame sequential colour camera 702 operates on the same basic principles as frame sequential colour cameras described in prior art, excepting that an output therefrom is a frame sequential colour signal. The digital image compressor 704 is preferably in the form of dedicated hardware, firmware and software components implementing the compression portion of a CODEC so as to efficiently compress the data received from the frame sequential colour camera 702 via the communication link 703 and thereby to maintain loop latency within reasonable limits. The digital data link 705 is often a cable but is sometimes a wireless communications link. The digital image extractor is for extracting data compressed by the digital compressor, and is preferably in the form of dedicated hardware, firmware and software implementing the decompression portion of a CODEC so as to efficiently execute in reverse the algorithm used at the compression stage to restitute the original, uncompressed image, sometimes with some level of resulting image degradation in comparison to its original counterpart. Timing diagram 720 shows a timing graph 722 of sequential colour image fields from the field sequential colour camera 702, a timing graph 724 of compressed digital data provided by the digital image compression means 704, and a timing graph 726 of digital image data provided by the digital image decompression means 706 to the display 708. The timing diagram 720 also indicates the delay for compression 728 and decompression 729. The upper bound for the compression and decompression delay is preferably shorter than the duration of a single primary colour image or image portion when interlacing is used 740. Table 730 shows the timing, frequencies and latency for the present and prior art video systems for comparison.

The use of anthropomorphic visual telepresence systems as described in FIGS. 6 and 7 is highly advantageous in applications where a remote controlled vehicle is exposed to high levels of radiation, for example solar wind and cosmic rays in space applications or radiation in nuclear facilities, which hold the potential for at least indirectly distorting analog signal transmission.

Figure 8:
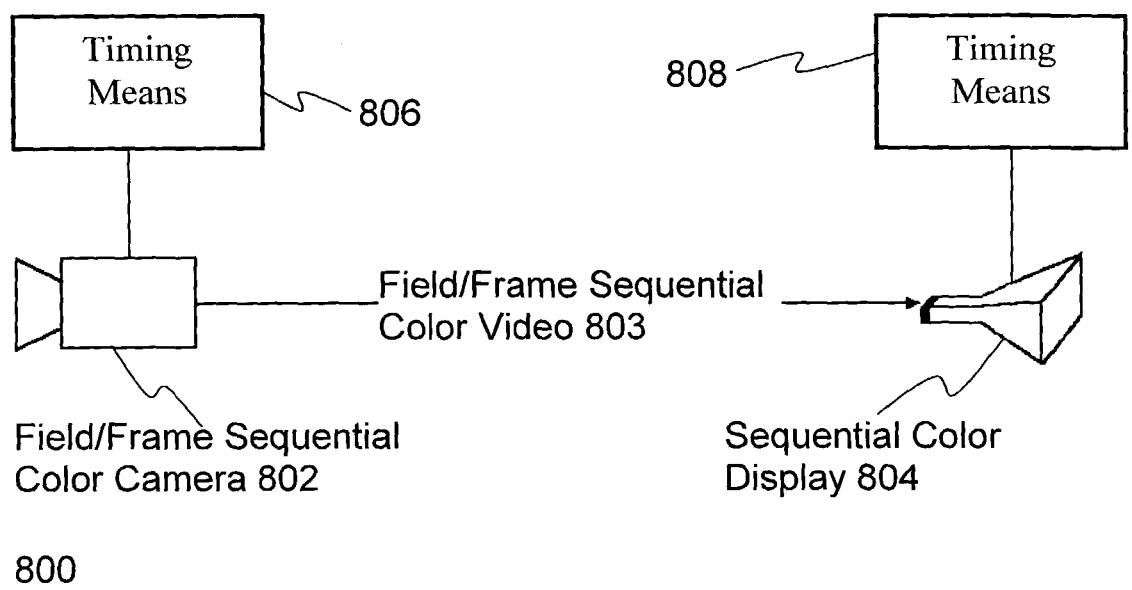
FIG. 8 illustrates a sequential colour video loop with timing means according to the invention.

FIG. 8 shows another embodiment of an anthropomorphic visual telepresence system 800 according to the invention. A field or frame sequential colour camera 802 is linked by a communication link 803 to a field or frame sequential display 804. Connected to the camera 802 and the display 804 are timing means 806 and 808 respectively. The timing information from the timing means 806 such as a Global Positioning System, GPS receiver, or other form of satellite-based global positioning system is embedded within a synchronization signal and transmitted via the communication link 803. At the display 804, this timing information is compared with timing information from timing means 808 in order to determine loop latency. This is beneficial in applications where the loop delay varies such as a highly mobile vehicle. For example, such a vehicle may require satellite communication links for the digital data link when located in some areas. In other areas, direct wireless communication is used. Because the digital data link path length is significantly different between direct communication links and those requiring satellites, such a timing marker is advantageous. Furthermore, it enables implementation of time delay correction algorithms to alter the displayed image in order to alleviate adverse psycho-physiological effects of latency in visual telepresence systems. Alternatively, a slow drift is used to vary timing from a first latency to a second latency when latency resulting from the digital data link is substantially varied between image frames.

In an alternative embodiment, each image is encoded with further data corresponding to sensor input. For example, vehicle speed is encoded into each image in a same location and in a fashion that is intelligible to an operator of the visual telepresence system. Encoding data in this fashion is well known. For example, video cameras as are commonly available often allow superposition of date or time information onto an image frame. Similarly, speed information could be superimposed onto images of a telepresence system.

Of course, numerous other embodiments may be envisaged without departing from the spirit and scope of the claimed invention.

What is claimed is:

1. An anthropomorphic visual telepresence system comprising:
   a) a head tracker for sensing movement of an operator's head;
   b) a sequential colour camera for capturing a colour image as a sequence of colour component images;
   c) a servomechanism coupled to said camera and responsive to signals from said head tracker to cause said camera to track movements of the operator's head;
   d) said sequential colour camera generating a sequential output signal representing each of said captured component colour images in a sequence of time intervals;
   e) said sequential colour camera inserting in each said sequence a synchronization signal to ensure synchronization and sequence alignment of said component colour images captured by said sequential colour camera;
   f) a head-mountable sequential colour display; and
   g) a communications link for carrying said sequential output signal from said sequential colour camera to said head-mountable sequential colour display whereby said sequential output signal is applied as an input to said sequential colour display;
   h) said sequential colour display being responsive to said sequential output signal and said synchronization signal from said sequential colour camera to display said colour image as said sequence of said colour component images.

2. A sequential colour visual telepresence system according to claim 1, wherein the sequential colour camera is a field sequential colour camera.

3. A sequential colour visual telepresence system according to claim 2, wherein the sequential colour display is a field sequential colour display.

4. A sequential colour visual telepresence system according to claim 1, wherein the sequence of captured colour component images comprises three sequential image portions covering the primary colours substantially for odd numbered image lines and three sequential image portions covering the primary colours substantially for even numbered image lines.

5. A sequential colour visual telepresence system according to claim 1, wherein the sequence of colour component images comprises image portions substantially covering in succession odd numbered image lines and even numbered image lines for one primary colour and then image portions substantially covering in succession odd numbered image lines and even numbered image lines for another primary colour.

6. A sequential colour visual telepresence system according to claim 1, wherein the sequence of captured images comprises image portions alternating between portions comprising odd and even image lines, and wherein the primary colour changes between captured images.

7. A sequential colour visual telepresence system according to claim 1, further comprising a digital video transmitter for transmitting a digital video signal from the sequential colour camera to the sequential colour display over said communications link.

8. A sequential colour visual telepresence system according to claim 1, further comprising:
   a) timing means connected to the sequential colour camera for creating a timing signal; and,
   b) timing means connected to the sequential colour display,
   wherein the timing signal is included in said sequential output signal.

9. A sequential colour visual telepresence system according to claim 8, wherein the timing means comprises a GPS receiver.

10. A sequential colour visual telepresence system according to claim 8, comprising a time delay correction algorithm.

11. A sequential colour visual telepresence system according to claim 1, wherein the sequential colour camera is a frame sequential colour camera.

12. A sequential colour visual telepresence system according to claim 11, wherein the sequential colour display is a frame sequential colour display.

13. A sequential colour visual telepresence system comprising:
   a) a head tracker for sensing movement of an operator's head;
   b) a sequential colour camera for capturing a colour image as a sequence of colour component images;
   c) a servomechanism coupled to said camera and responsive to signals from said head tracker to cause said camera to track movements of the operator's head;
   d) said sequential colour camera generating a sequential output signal representing each of said captured component colour images in a sequence of time intervals;
   e) said sequential colour camera inserting in each said sequence a synchronization signal to ensure synchronization and sequence alignment of said component colour images captured by said sequential colour camera;
   f) a head-mountable sequential colour display;
   g) a communications link for carrying said sequential output signal from said sequential colour camera to said head-mountable sequential colour display whereby said sequential output signal is applied as an input to said sequential colour display;

h) said sequential colour display being responsive to said sequential output signal and said synchronization signal from said sequential colour camera to display said colour image as said sequence of said colour component images;

i) digital image compression means for sequentially compressing data representing the captured colour component images received from the sequential colour camera; and j) digital image decompression means for sequentially extracting the captured component colour images from the data compressed by the compression means, and wherein the communications link is a digital data link for transmitting information in the form of digital data.

14. A sequential colour visual telepresence system according to claim 13, wherein the digital image compression means comprises a digital image compressor.

15. A sequential colour visual telepresence system according to claim 13, wherein the digital image decompression means comprises a digital image extractor.

* * * * *